3,490,972
METHOD OF LAMINATING PLASTIC FILMS IN ABSENCE OF ADHESIVE AND HEAT SEALING TEMPERATURES
Claude E. Rogers, Sanford, Mich., assignor to The Dow Chemical Company, Midland, Mich., a corporation of Delaware
Filed Sept. 30, 1966, Ser. No. 583,235
Int. Cl. B32b *31/18, 31/20, 23/00*
U.S. Cl. 156—162                    5 Claims

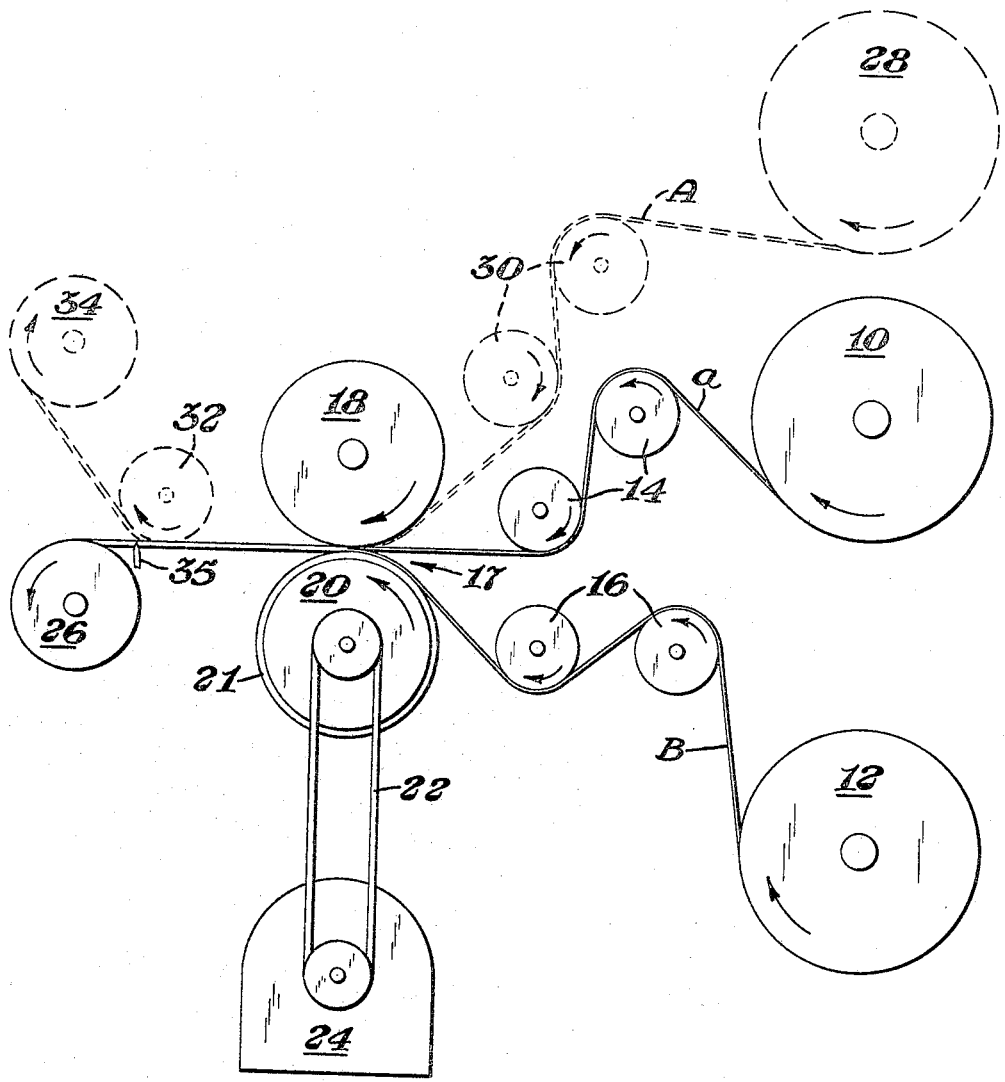

ABSTRACT OF THE DISCLOSURE

A method for continuously laminating a plurality of plastic films in the absence of adhesives and heat sealing temperatures to attain a smooth, continuously laminar structure void of essentially all residual air between the combined films. The method includes trimming the outer edges of the films, while winding the same, to provide for channeling of residual air between the combined films to the edges, and maintaining the films under uniform winding tension until essentially all the residual air has been removed.

---

This invention relates to an improved film laminating process, and more particularly to a process wherein two or more plastic films are joined together into a unitary structure without the use of adhesive or high temperatures wherein substantial softening of the film occurs.

Heretofore, several plies of plastic film have been laminated using adhesive or by heat-sealing the plies by a heated pressure roll. U.S. Patents 2,554,150 and 2,966,439 disclose such prior art techniques in detail. Unless adhesive or heat sealing is utilized, the plies separate easily especially during use, such as encountered when the laminated film is used in packaging machinery.

It is frequently desirable to laminate film stock to improve strength, vapor transmissibility, moisture proofness, flexibility and the like. For example, in film used for wrapping meat, it is desirable to have ease of carbon dioxide and oxygen transmission through the film. There is no one film which accomplishes such ready transmissibility so the trade has resorted to coating film or laminating various plies of film to custom-fit the properties of available film stock. Unfortunately, the use of adhesive or the heat sealing of one film to another complicates the attainment of this goal.

Other situations exist in which laminated film without adhesive or heat sealing would be most desirable.

Accordingly, an object of this invention is to provide a process wherein two or more plastic films may be joined together into a permanent unitary structure without the use of adhesive or heat-seal bonding.

Another object is to provide a laminating process for thin films of polyethylene, polypropylene, polyvinylidene chloride, coolymers of vinylidene chloride and vinyl chloride, cellophane, polyester, and combinations thereof including the heretofore unobtainable combination of films of polyethylene and films prepared from the normally crystalline vinylidene chloride polymers.

Still another object is to provide a film laminating process wherein the undesirable effect of trapped air between the laminated plies is minimized.

A further object is to provide a film laminating process which encourages cold flow, i.e. the smoothing out of film irregularities, between the laminated plies so that a permanent unitary web structure is eventually attained.

According to the present invention, continuously adherent laminate film structures are obtained by application of the following sequential series of steps:

(a) Bringing the films to be joined into intimate tensioned contact along a transverse line defined by a hard surface and a resilient surface such as provided by conventional press and bed rolls, (b) Applying pressure and moderate heat across the transverse line wherein the heat applied is below the softening point of the films, (c) Trimming the outer film edges while winding the films into roll forms, thereby preventing overlap or heat sealing of such edges and providing for channeling of residual air from between such edges, then (d) Maintaining the films under winding tension until essentially all of the residual air has been removed and any irregularities in the film surfaces have smoothed out.

Reference is now made to the attached drawing to describe the process in more detail.

As seen therein, films A and B (which may be similar or dissimilar plastic materials, such as polyethylene, polypropylene, polyvinylidene chloride, a copolymer of vinylidene chloride and vinyl chloride, cellophane and polyester, among others and combinations thereof) are each unrolled from supply rolls 10 and 12 respectively and then fed through tension rolls 14 and 16 and then through nip 17 created between hard-surface heated press roll 18 and resilient cover bed roll 20. Resilient cover 21 on the bed roll is preferably rubber. The nip provides a line of pressure transverse to the line of travel of the film which presses out air that may become lodged between the plies. The tension rolls 14 and 16 provide the uniform tension so that when the films are pressed together in the nip 17, the air agglomerates are squeezed out of the edges of the films so that cold flow may occur subsequently.

Bed roll 20 is driven by motor 24 via belt 22. The outer film edges of the laminate are then continuously trimmed, as by use of a razor blade 35, while the laminate is being wound upon windup roll 26.

To facilitate release of the formed laminate from the heated press roll, it is occasionally desirable to mask the surface of such press roll. This is best accomplished by interposition of a release web between the top surface of the laminate and the press roll surface. Such interposition is best accomplished by supplying a sheet A of polyester of polytetrafluoroethylene in the form of a continuous web from supply roll 28 which is tensioned via tension rolls 30, and passed into nip 17 adjacent the press roll surface. It then passes under an idler roll 32 and is wound upon a windup roll 34.

Reference is now made to specific examples to illustrate use of the process of the present invention.

EXAMPLE 1

Two sheets of film, one Saran film (which was a polyvinylidine chloride film similar to that described in U.S. Patent 2,477,656) and the other polyethylene, were combined using the apparatus shown in the drawing while using a lamination speed of about 25 feet of film per minute. The temperature was adjusted to about 300° F. and a polyethylene terephthalate release sheet was used to keep the film from sticking to the press roll. It was noted that when the laminated emerged from the rolls, it contained evidence of residual air between the film plies. Following trimming of the film edges and winding of the film structure onto a conventional wind-up roll, some evidence of irregularities between the film surfaces was still apparent. The laminate structure was then maintained under winding pressure (in roll form) for a period of about 12 hours under normal room temperatures, after which such irregularities had completely disappeared and a smooth, continuously adhered laminate film structure was obtained.

EXAMPLE 2

A smooth, continuously adherent laminate structure composed of two individual plies of Saran film (a 50 gauge to 135 gauge combination) was made in the manner described in Example 1, except that the release sheet was not used and the temperature was adjusted to about 150° F.

EXAMPLE 3

Highly desirable laminate film structures were prepared by the process described herein from the following individual film pairs while using a temperature between about 100° to 300° F. and a lamination speed of about 35 feet per minute.

Polyethylene to polyethylene
Polyethylene to polypropylene
Vinyl to Saran
Cellophane to Saran The preferred range of lamination temperatures used will vary with the films being combined, and the speed of lamination. As indicated, a lamination speed of about 35 feet per minute has been found to be desirable, however, higher rates are possible up to about 100 feet per minute.

Speculating as to the reason for the enhanced lamination achieved when two or more films were pressed together by the process of this invention, the following is by way of explanation:

Films are not planer, but rough and do not approach each other by total surface contact when first brought together. Several points of contact may occur. Should the spaces between the points of contact be considered as bumps meeting a spot on an adjacent film, a void of air would occur. Visually the space around the bump appears as a silvery discoloration and can best be observed through a low-powered microscope.

Specifically, following the initial combination of the materials to be laminated, a hazy or silvery appearance generally develops between the individual film plies. Within a few minutes thereafter an unrolled sheet of the combined material will begin to show a blistery appearance. Even the most careful combination of film will have entrapped air and display silvery spots or blisters if they are not rolled tightly. It is the rolling up under and subsequent application of uniform tension which puts pressure on the air "agglomerates" and squeezes them out of the edges of the film which makes it a clear combination of two or more films. As the air leaves, the irregularities in the film materials cold-flow together and further enhance the bond.

When moderate heat is applied during the combining and/or afterwards, it will accelerate cold-flow and if channels are available, cause the air to leave more rapidly. Of course, if there are loose or soft spots in the roll, it interferes with the channeling of the air to the outer reaches and creates an undesirable situation. Likewise, too, if the film is rolled over at the edges, a seal is made and air may not leave.

What is claimed is:

1. In the process for continuously laminating a plurality of plastic films in the absence of adhesives and heat sealing temperatures comprising the sequential steps of bringing the films to be joined into intimate tensioned contact along a transverse line defined by a hard surface and a resilient surface; applying pressure and moderate heat below the softening point of said films, across said transverse line; and winding said films into roll form; the improvement consisting of: trimming the outer edges of said films, while winding the same, to prevent overlap or heat sealing of said edges and to provide for channeling of residual air between said films to said edges, and maintaining said films under uniform winding tension until essentially all of the residual air has been removed and said films have formed a smooth, continuous laminar structure.

2. The process of claim 1 wherein vinylidene chloride polymer film and polyethylene film are joined into a laminar structure.

3. The process of claim 1 wherein a plurality of vinylidene chloride polymer films are joined into a laminar structure.

4. The process of claim 1 wherein vinyl polymer film and vinylidene chloride polymer film are joined into a laminar structure.

5. The process of claim 1 wherein cellophane film and vinylidine chloride polymer film are joined into a laminar structure.

References Cited

UNITED STATES PATENTS

| 2,988,134 | 6/1961 | Nissel | 156—267 |
| 3,081,212 | 3/1963 | Taylor et al. | 156—164 |

FOREIGN PATENTS

| 208,041 | 5/1957 | Australia. |

PHILIP DIER, Primary Examiner

U.S. Cl. X.R.

156—192, 267, 306, 582; 161—249, 252; 206—46; 229—3.5